(12) United States Patent
Yin et al.

(10) Patent No.: US 10,305,300 B2
(45) Date of Patent: May 28, 2019

(54) SELF-ACTIVATION CIRCUIT AND BATTERY PROTECTION SYSTEM

(71) Applicant: SOCREAT ELECTRONICS TECHNOLOGY LIMITED, Shenzhen (CN)

(72) Inventors: Zhenkun Yin, Shenzhen (CN);
Baichuan Xiang, Shenzhen (CN);
Xingqing Wang, Shenzhen (CN)

(73) Assignee: SOCREAT ELECTRONICS TECHNOLOGY LIMITED, Shenzhen (CN)

(*) Notice: Subject to any disclaimer, the term of this patent is extended or adjusted under 35 U.S.C. 154(b) by 66 days.

(21) Appl. No.: 15/572,498

(22) PCT Filed: Mar. 10, 2017

(86) PCT No.: PCT/CN2017/076224
§ 371 (c)(1),
(2) Date: Nov. 8, 2017

(87) PCT Pub. No.: WO2017/185884
PCT Pub. Date: Nov. 2, 2017

(65) Prior Publication Data
US 2018/0115173 A1    Apr. 26, 2018

(30) Foreign Application Priority Data
Apr. 28, 2016  (CN) .......................... 2016 1 0271374

(51) Int. Cl.
*H02J 7/00*  (2006.01)
*H02H 7/18*  (2006.01)

(52) U.S. Cl.
CPC ............. *H02J 7/0029* (2013.01); *H02H 7/18* (2013.01); *H02J 2007/004* (2013.01); *H02J 2007/0037* (2013.01); *H02J 2007/0039* (2013.01)

(58) Field of Classification Search
CPC ............. H02J 7/0029; H02J 2007/0039; H02J 2007/0037; H02J 2007/004; H02H 7/18
(Continued)

(56) References Cited

U.S. PATENT DOCUMENTS 9,058,044 B2 * 6/2015 Smith ..................... G05F 1/575
2017/0005499 A1 * 1/2017 Zhang ................... H02J 7/0029

* cited by examiner

*Primary Examiner* — M Baye Diao

(57) ABSTRACT

The present disclosure provides a self-activation circuit, where the self-activation circuit comprises an N-type metal oxide semiconductor (MOS) transistor Q4, a PNP-type transistor Q2, resistors R20, R21, R24, R25, and a capacitor C2. A first end of the resistor R25 is connected with a detection pin (CS) of the battery protection chip, and a drain electrode of the N-type MOS transistor Q4 is connected with a second end of the resistor R25. A source electrode of the N-type MOS transistor Q4 is connected with a ground end of the storage battery, and a gate electrode of the N-type MOS transistor Q4 is connected with the ground end of the storage battery by the resistor R20. A collector electrode of the PNP-type transistor Q2 is connected with the gate electrode of the N-type MOS transistor Q4, and an emitter electrode of the PNP-type transistor Q2 is connected with an anode (PB+) of the storage battery; a base electrode of the PNP-type transistor Q2 is connected with the anode (PB+) of the storage battery by the resistor R21, and the base electrode of the PNP-type transistor Q2 is connected with the ground end of the storage battery by the resistor R24. The capacitor C2 is connected with the resistor R24 in parallel. When the self-activation circuit is connected with the battery protection chip at first time, level of the detection (Continued)

pin (CS) of the battery protection chip automatically reduces, further automatically activating the battery protection system and improving reliability of the battery protection system.

7 Claims, 2 Drawing Sheets

(58) Field of Classification Search
USPC .......................................................... 320/128
See application file for complete search history.

SELF-ACTIVATION CIRCUIT AND BATTERY PROTECTION SYSTEM

TECHNICAL FIELD

The present disclosure relates to the field of battery management, and more particularly to a self-activation circuit and a battery protection system.

BACKGROUND

When a battery protection chip of a battery protection system is connected to a storage battery, the battery protection chip cannot be activated because level of a detection pin is in an uncertain state. Thus, the battery protection chip cannot work normally.

SUMMARY

The aim of the present disclosure is to provide a self-activation circuit. When the self-activation circuit is connected with a battery protection chip at first time, a level of a detection pin (CS) of the battery protection chip automatically reduces, further automatically activating the battery protection system and improving reliability of the battery protection system.

The aim of the present disclosure is achieved through a technical scheme as follow:

A self-activation circuit comprises: an N-type metal oxide semiconductor (MOS) transistor Q4, a PNP-type transistor Q2, resistors R20, R21, R24, R25, and a capacitor C2. A first end of the resistor R25 is connected with a detection pin (CS) of the battery protection chip, and a drain electrode of the N-type MOS transistor Q4 is connected with a second end of the resistor R25. A source electrode of the N-type MOS transistor Q4 is connected with a ground end of the storage battery, and a gate electrode of the N-type MOS transistor Q4 is connected with the ground end of the storage battery by the resistor R20. A collector electrode of the PNP-type transistor Q2 is connected with the gate electrode of the N-type MOS transistor Q4, and an emitter electrode of the PNP-type transistor Q2 is connected with an anode (PB+) of the storage battery; a base electrode of the PNP-type transistor Q2 is connected with the anode (PB+) of the storage battery by the resistor R21, and the base electrode of the PNP-type transistor Q2 is connected with the ground end of the storage battery by the resistor R24. The capacitor C2 is connected with the resistor R24 in parallel.

Furthermore, the self-activation circuit further comprises a fast recovery diode D10. An anode of the fast recovery diode D10 is connected with the base electrode of the PNP-type transistor Q2, and a cathode of the fast recovery diode D10 is connected with the emitter electrode of the PNP-type transistor Q2.

Furthermore, the self-activation circuit further comprises a capacitor C3. The capacitor C3 is connected with the capacitor C2 in parallel.

A battery protection system having the above self-activation circuit, comprises: a battery protection chip U3, a capacitor C9, N-type MOS transistors Q5, and Q6. A detection pin (CS) of the battery protection chip U3 is connected with the first end of the resistor R25. A charge control pin (OD) of the battery protection chip U3 is connected with a gate electrode of the N-type MOS transistor Q5. A discharge control pin (OC) of the battery protection chip U3 is connected with a gate electrode of the N-type MOS transistor Q6. A drain electrode of the N-type MOS transistor Q5 is connected with a drain electrode of the N-type MOS transistor Q6.

Furthermore, the battery protection system further comprises resistors R18, R19, and a capacitor C9. The detection pin (CS) of the battery protection chip U3 is connected with a circuit of the storage battery through the resistor R19. A power supply pin (VDD) of the battery protection chip U3 is connected with the anode (PB+) of the storage battery by the resistor R18 and is connected with a ground by the capacitor C9.

A technical effect of the present disclosure is that:

(1) When the self-activation circuit is connected with the battery protection chip at first time, level of the detection pin (CS) of the battery protection chip automatically reduces, further automatically activating the battery protection system and improving reliability of the battery protection system.

(2) When the storage battery is disconnected in the battery protection system, the electrical charge of the capacitors C2, C3 is quickly pulled out by the fast recovery diode D10, further increasing connection speed of the NPN-type transistor Q2 and improving reliability of the self-activation circuit.

DETAILED DESCRIPTION

The present application will be further described in detail below in combination with the drawings and preferred embodiments.

In a battery protection system, a battery protection chip is used to detect overcharge, over-discharge, and over-current of a rechargeable storage battery. A detection pin (CS) of the battery protection chip is used to detect overcharge, over-discharge, and over-current of a storage battery. A discharge control pin (OD) is used to control a discharge switch of a storage battery. A charge control pin (OC) is used to control a charge switch of the storage battery. The battery protection chip detects whether overcharge, over-discharge, or over-current of the storage battery appear through the detection pin (CS). And the battery protection chip controls the discharge switch of the storage battery or the charge switch of the storage battery through control signals output by the discharge control pin (OD) and the charge control pin (OC).

When the storage battery is connected in the battery protection system, an original state of the detection pin (CS) of the battery protection chip is an uncertain state. Thus, a protection circuit cannot be activated and reliability of the protection circuit is reduced. At this time, the detection pin (CS) of the battery protection chip needs to be short connected with a ground end of the storage battery and be disconnected with the ground end of the storage battery, or the battery protection system needs to be external connected with a charge device to activate the protection circuit, further making the battery protection chip restore to a normal working state.

Figure 1:
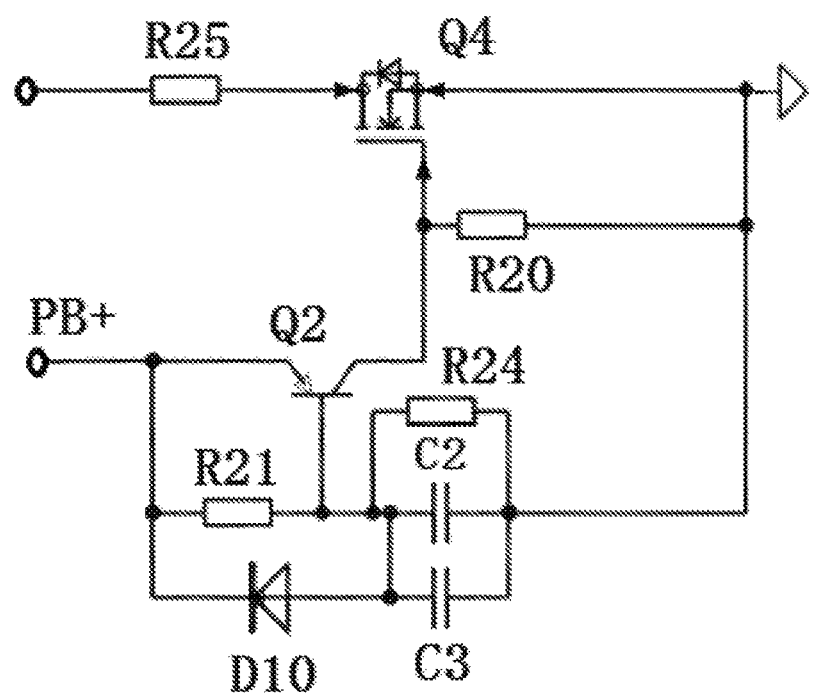
FIG. 1 is a circuit schematic diagram of a self-activation circuit.

As shown in FIG. 1, FIG. 1 is a circuit schematic diagram of a self-activation circuit. A aim of the self-activation circuit is to solve the above issue that the battery protection chip is connected with the battery protection chip at a first time and the self-activation circuit cannot be activated. The self-activation circuit comprises an N-type metal oxide semiconductor (MOS) transistor Q4, a PNP-type transistor Q2, resistors R20, R21, R24, R25, capacitors C2,C3, and a fast recovery diode D10.

A drain electrode of the N-type MOS transistor Q4 is connected with a second end of the resistor R25, a first end of the resistor R25 is connected with the detection pin of the battery protection chip of the battery protection system, a source electrode of the N-type MOS transistor Q4 is connected with the ground end of the storage battery, and a gate electrode of the N-type MOS transistor Q4 is connected with the ground end of the storage battery by the resistor R20.

A collector electrode of the PNP-type transistor Q2 is connected with the gate electrode of the N-type MOS transistor Q4, and an emitter electrode of the PNP-type transistor Q2 is connected with an anode of the storage battery. A base electrode of the PNP-type transistor Q2 is connected with the anode of the storage battery by the resistor R21, and the base electrode of the PNP-type transistor Q2 is connected with the ground end of the storage battery by the resistor R24. The capacitors C2, C3 are connected with the resistor R24 in parallel, respectively. An anode of the fast recovery diode D10 is connected with the base electrode of the PNP-type transistor Q2, and a cathode of the fast recovery diode D10 is connected with the emitter electrode of the PNP-type transistor Q2.

Figure 2:
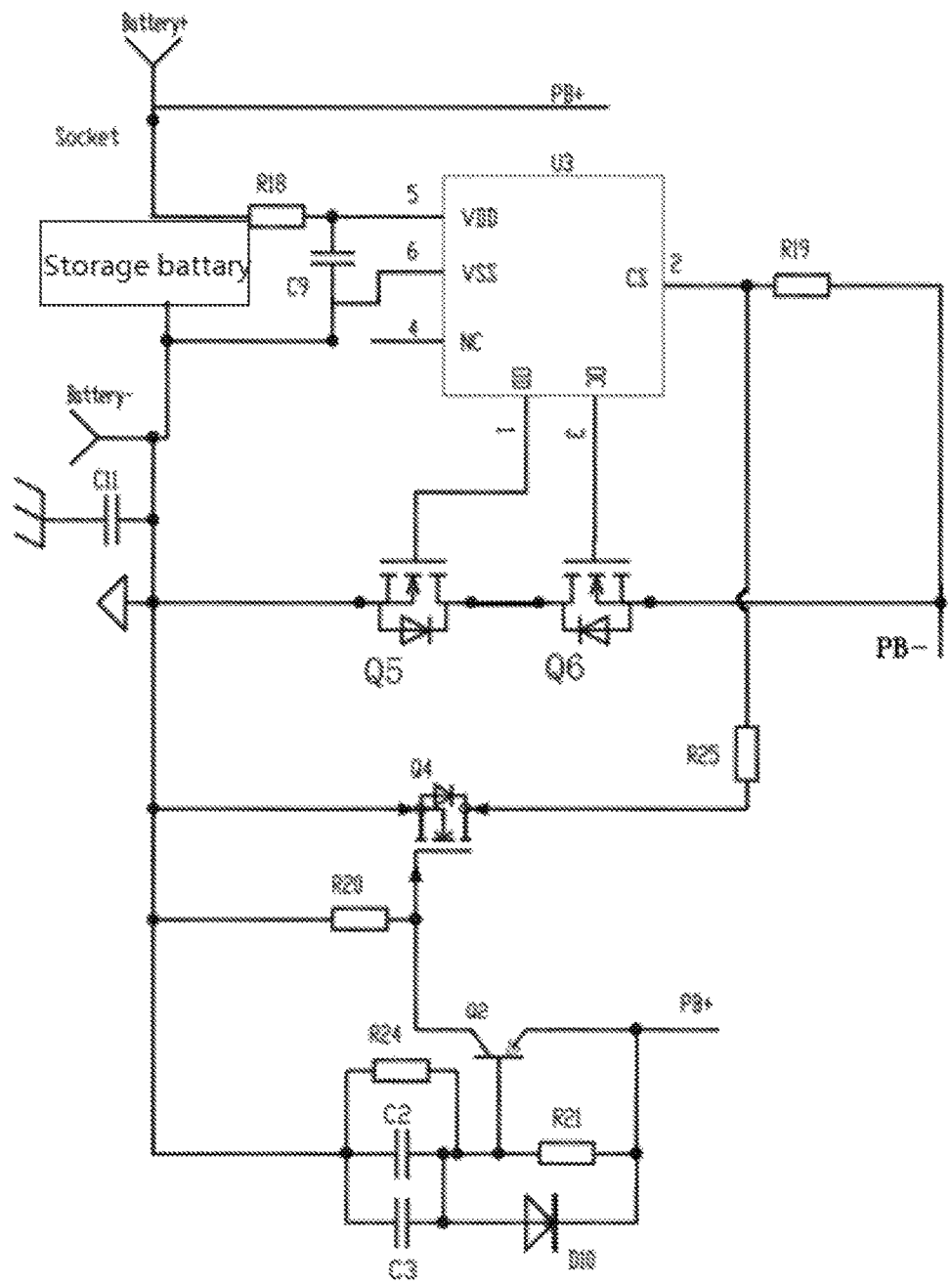
FIG. 2 is a circuit schematic diagram of a battery protection system having the self-activation circuit as shown in FIG. 1.

FIG. 2 is an application embodiment of the present disclosure. The battery protection system having the self-activation circuit further comprises the battery protection chip U3, resistors R18, R19, a capacitor C9, N-type MOS transistors Q5, and Q6.

In the embodiment, the battery protection chip U3 prefers to use HY2112 chip, where HY2112 chip is designed and researched by Taiwan Hong Hong Technology Co., Ltd., and is suitable to protect overcharge, over-discharge, and over-current of a signal-stage ferric phosphate rechargeable storage battery. The detection pin of the battery protection chip U3 is connected with the first end of the resistor R25, the discharge control pin of the battery protection chip U3 is connected with a gate electrode of the N-type MOS transistor Q5, and the charge control pin of the battery protection chip U3 is connected with a gate electrode of the N-type MOS transistor Q6. A drain electrode of the N-type MOS transistor Q5 is connected with a drain electrode of the N-type MOS transistor Q6, and the N-type MOS transistor Q5 and the N-type MOS transistor Q6 both have a parasitic diode. The N-type MOS transistor Q5 and the N-type MOS transistor Q6 are regarded as the discharge switch of the storage battery and the charge switch of the storage battery, respectively. A power supply pin of the battery protection chip U3 is connected with the anode of the storage battery by the resistor R18 and is connected with a ground by the capacitor C9, and a grounding pin VSS of the battery protection chip U3 is connected with the ground.

An operating principle of the self-activation circuit in the battery protection system is that:

When the storage battery is connected in the battery protection system, an output voltage of the anode of the storage battery is through current limitation and voltage regulator of the resistor R18 and the capacitor C9, and is provided for the battery protection chip U3. The N-type MOS transistor Q4 to conduct. At this time, the detection pin of the battery protection chip is connected with the ground through the resistor R25 and the N-type MOS transistor Q4, and the detection pin of the battery protection chip is at a low level, thus, the battery protection system is activated. The resistor R25 is used to limit current, further reducing impact of sharp pulse at conducting instant of the N-type MOS transistor Q4 the on the circuit. The charge control pin (OC) of the battery protection chip U3 and the discharge control pin (OD) of the battery protection chip U3 output high levels to the gate electrode of the N-type MOS transistor Q6 and the gate electrode of the N-type MOS transistor Q5, respectively, and the N-type MOS transistor Q6 and the N-type MOS transistor Q5 turn on. At this time, the battery protection system is at the normal working state and the battery protection system can charge and discharge for external.

After the battery protection system is activated, the storage battery is constantly charging for the capacitors C2, C3. A voltage of the base electrode of the NPN-type transistor Q2 constantly increases. When the voltage of the base electrode of the NPN-type transistor Q2 reaches to a cut-off voltage, the NPN-type transistor Q2 turn off. The gate electrode of the N-type MOS transistor Q4 is connected with the ground end of the storage battery through the resistor R20, at this time, the gate electrode of the N-type MOS transistor Q4 is at the low level, the N-type MOS transistor Q4 turns off. The detection pin of the battery protection chip U3 normally detects discharge and charge of the storage battery.

When the storage battery constantly provides power for the NPN-type transistor Q2, the resistor R24 ensures the voltage of the base electrode of the NPN-type transistor Q2 reaches to the cut-off voltage to make the detection pin of the battery protection chip U3 normally detect discharge and charge of the storage battery. When the storage battery is disconnected in the battery protection system, electrical charge of the capacitors C2, C3 is released from the resistor R24 and the NPN-type transistor Q2 turns on. Thus, when the storage battery is reconnected in the battery protection system, the self-activation circuit can work normally.

The fast recovery diode D10 ensures voltage difference between the base electrode and the emitter electrode of the NPN-type transistor Q2 is 0.7V. When the storage battery is disconnected in the battery protection system, the electrical charge of the capacitors C2, C3 is quickly pulled out by the fast recovery diode D10, further increasing connection speed of the NPN-type transistor Q2 and improving reliability of the self-activation circuit.

As the above, it should be understood that the present disclosure has been described with reference to certain preferred and alternative embodiments which are intended to be exemplary only and do not limit the full scope of the present disclosure as set fourth in the appended claims.

We claim:

1. A self-activation circuit, comprising:
    an N-type metal oxide semiconductor (MOS) transistor Q4, a PNP-type transistor Q2, resistors R20, R21, R24, R25, and a capacitor C2;
    wherein a first end of the resistor R25 is connected with a detection pin (CS) of the battery protection chip, and a drain electrode of the N-type MOS transistor Q4 is connected with a second end of the resistor R25; a source electrode of the N-type MOS transistor Q4 is connected with a ground end of the storage battery, and a gate electrode of the N-type MOS transistor Q4 is connected with the ground end of the storage battery by the resistor R20;
    wherein a collector electrode of the PNP-type transistor Q2 is connected with the gate electrode of the N-type MOS transistor Q4, and an emitter electrode of the PNP-type transistor Q2 is connected with an anode (PB+) of the storage battery; a base electrode of the PNP-type transistor Q2 is connected with the anode (PB+) of the storage battery by the resistor R21, and the base electrode of the PNP-type transistor Q2 is connected with the ground end of the storage battery by the resistor R24;

wherein the capacitor C2 is connected with the resistor R24 in parallel.

2. The self-activation circuit as claimed in claim 1, further comprising:

a fast recovery diode D10;

wherein an anode of the fast recovery diode D10 is connected with the base electrode of the PNP-type transistor Q2, and a cathode of the fast recovery diode D10 is connected with the emitter electrode of the PNP-type transistor Q2.

3. The self-activation circuit as claimed in claim 1, further comprising:

a capacitor C3;

wherein the capacitor C3 is connected with the capacitor C2 in parallel.

4. A battery protection system, comprising:

a self-activation circuit, a battery protection chip U3, a capacitor C9, N-type MOS transistors Q5, and Q6;

wherein the self-activation circuit comprises an N-type metal oxide semiconductor (MOS) transistor Q4, a PNP-type transistor Q2, resistors R20, R21, R24, R25, and a capacitor C2;

wherein a first end of the resistor R25 is connected with a detection pin (CS) of the battery protection chip, and a drain electrode of the N-type MOS transistor Q4 is connected with a second end of the resistor R25; a source electrode of the N-type MOS transistor Q4 is connected with a around end of the storage battery, and a gate electrode of the N-type MOS transistor Q4 is connected with the around end of the storage battery by the resistor R20;

wherein a collector electrode of the PNP-type transistor Q2 is connected with the gate electrode of the N-type MOS transistor Q4, and an emitter electrode of the PNP-type transistor Q2 is connected with an anode (PB+) of the storage battery; a base electrode of the PNP-type transistor Q2 is connected with the anode (PB+) of the storage battery by the resistor R21, and the base electrode of the PNP-type transistor Q2 is connected with the around end of the storage battery by the resistor R24;

wherein the capacitor C2 is connected with the resistor R24 in parallel;

wherein a detection pin (CS) of the battery protection chip U3 is connected with the first end of the resistor R25;

wherein a charge control pin (OD) of the battery protection chip U3 is connected with a gate electrode of the N-type MOS transistor Q5;

wherein a discharge control pin (OC) of the battery protection chip U3 is connected with a gate electrode of the N-type MOS transistor Q6;

wherein a drain electrode of the N-type MOS transistor Q5 is connected with a drain electrode of the N-type MOS transistor Q6.

5. The battery protection system as claimed in claim 1, further comprising resistors R18, R19, and a capacitor C9:

wherein the detection pin (CS) of the battery protection chip U3 is connected with a circuit of the storage battery through the resistor R19;

wherein a power supply pin (VDD) of the battery protection chip U3 is connected with the anode (PB+) of the storage battery by the resistor R18 and is connected with a ground by the capacitor C9.

6. The battery protection system as claimed in claim 4, wherein the self-activation circuit further comprises a fast recovery diode D10;

wherein an anode of the fast recovery diode D10 is connected with the base electrode of the PNP-type transistor Q2, and a cathode of the fast recovery diode D10 is connected with the emitter electrode of the PNP-type transistor Q2.

7. The battery protection system as claimed in claim 6, further comprising resistors R18, R19, and a capacitor C9;

wherein the detection pin (CS) of the battery protection chip U3 is connected with a circuit of the storage battery through the resistor R19;

wherein a power supply pin (VDD) of the battery protection chip U3 is connected with the anode (PB+) of the storage battery by the resistor R18 and is connected with a ground by the capacitor C9.

* * * * *